United States Patent
Park et al.

(10) Patent No.: US 6,515,686 B1
(45) Date of Patent: Feb. 4, 2003

(54) COMPUTER SYSTEM FOR INTERFACE OF SHELL PROGRAM AND INTERFACE METHOD OF THE SAME

(75) Inventors: Soo-Jung Park, Suwon (KR); Myoung-Ho Kim, Kwangmyoung-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/391,626

(22) Filed: Sep. 7, 1999

(30) Foreign Application Priority Data

Sep. 4, 1998 (KR) .............................. 98-36600

(51) Int. Cl.[7] .............................. G09G 3/00; G06F 3/14
(52) U.S. Cl. .................. 345/827; 345/826; 345/830; 345/831; 345/163; 345/168
(58) Field of Search ................ 345/156, 168, 345/163, 826, 827, 830, 831; 395/650

(56) References Cited

U.S. PATENT DOCUMENTS

| | | | |
|---|---|---|---|
| 5,121,477 A | 6/1992 | Koopmans et al. ......... 395/156 |
| 5,261,097 A | * 11/1993 | Saxon ........................ 395/650 |
| 5,701,424 A | 12/1997 | Atkinson ..................... 395/352 |
| 5,786,811 A | 7/1998 | Jaeger ........................ 345/172 |
| 5,821,926 A | 10/1998 | Arita .......................... 345/333 |
| 5,874,954 A | 2/1999 | Kilmer et al. ............... 345/333 |
| 5,995,100 A | * 11/1999 | Auslander .................... 345/335 |
| 6,097,371 A | * 8/2000 | Siddiqui et al. ............. 345/164 |
| 6,104,359 A | * 8/2000 | Endres et al. ................. 345/3 |

OTHER PUBLICATIONS

Microsoft Computer Dictionary, Christey Bahn and Kim Fryer, Fourth Edition, 1999, Microsoft corporation, p. 263.*

* cited by examiner

Primary Examiner—Richard Hjerpe
Assistant Examiner—Kevin M. Nguyen
(74) Attorney, Agent, or Firm—Robert E. Bushnell, Esq.

(57) ABSTRACT

A method for shell program interface of a computer system is described. A shell program is activated by using a wheel button of a wheel mouse and a defined hotkey or only the wheel button. A wheel is moved back and forth to select and execute one of a plurality of application programs registered in the shell program. The input of the hotkey and the wheel button is determined by using a dynamic link library (DLL). As a result, it is suppressed that hotkeys of a plurality of application programs are collided.

20 Claims, 9 Drawing Sheets

COMPUTER SYSTEM FOR INTERFACE OF SHELL PROGRAM AND INTERFACE METHOD OF THE SAME

CLAIM OF PRIORITY

This application makes reference to, incorporates the same herein, and claims all benefits accruing under 35 U.S.C. §119 from an application entitled Computer System for Interface of Shell Program And Interface Method of The Same earlier filed in the Korean Industrial Property Office on the 4th day of September 1998, and there duly assigned Serial No. 98-36600, a copy of which is annexed hereto.

BACKGROUND OF THE INVENTION

1. Technical Field

The present invention relates to interface of a shell program, and more particularly to a computer system which activates a shell program driving a plurality of application programs by using a hotkey and a wheel button of a wheel mouse and an interface method of the shell program.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

Computer systems include a basic input output system (BIOS) which is an especially important program stored in read only memory (ROM). The basic input output system (BIOS) tests a computer every time the computer is powered on. The basic input output system (BIOS) can allocate a computer system's resources automatically, making adjustments needed to accommodate new hardware. Also, the basic input output system (BIOS) governs how system board components interact.

When the computer system is powered on, the basic input output system (BIOS) immediately takes control of the computer system and its components. The first duty of the basic input output system (BIOS) is to perform a series of diagnostic routines called the power on self test (POST) routine, which ensures that every part of the computer system's hardware is functioning properly.

In the personal computer system, there are many methods of executing a command or an application program depending on the operating system used in a computer system and its user interface method. Operating systems used in state-of-art personal computers adopt so-called graphic user interface (GUI). This graphic user interface has made a great contribution to the computing environment for its convenience in using the computer. For example, in the Windows (R) operating system developed by Microsoft Corporation, an application can be executed by selecting the corresponding icon placed on the Desktop or by exploring the File Manager or Explorer through mouse or keyboard operation. Basically, present operating systems adopting the GUI designate icons relative to every file or documents and icons are displayed on the monitor screen so that the user may select the desired one and execute it by clicking the mouse button.

In such an operating system, however, if many program icons are placed on the Windows Desktop or a program group window, those icons may cause inconvenience to a user in selecting a desired one among many icons. Further, if an icon corresponding to the desired application program is not presented in the Desktop, it is difficult for a novice to find the desired program in the Windows Explorer and to execute the very program.

I have found that a simplified and convenient access apparatus and method for a computer system would be desirable. Efforts have been made to develop devices and methods related to electrical systems and computer systems.

Exemplars of recent efforts in the art include U.S. Pat. No. 5,701,424 for Palladian Menus and Methods Relating Thereto issued to Atkinson, U.S. Pat. No. 5,874,954 for Centricity-Based Interface and Method issued to Kilmer et al., U.S. Pat. No. 5,821,926 for Method of Generating an Operating Button for Computer Processing, Method of Retrieving Data with the Operating Button and Method of Displaying the Operating Button issued to Arita, U.S. Pat. No. 5,786,811 for Operator/Circuit Interface with Integrated Display Screen issued to Jaeger, and U.S. Pat. No. 5,121,477 for System for Interactively Creating Action Bar Pull-Down Windows of a User Interface for Use at Program Run Time, issued to Koopmans et al.

While these recent efforts provide advantages, I note that they fail to adequately provide a simplified and convenient computer system for interface of shell program and interface method of the same.

SUMMARY OF THE INVENTION

It is an object of the present invention to implement shell program interface which enables a shell program for selecting, executing, and finishing a plurality of application programs to be used in a general computer system.

It is another object of the present invention to provide a computer system which activates a shell program by using an input device and a method of the same.

According to a feature of the present invention, a computer system with a processor, a memory, a plurality of application programs, and a shell program for selecting and executing one of a plurality of the application programs comprises an input means inputting a first or a second input signal and a driving means loading the shell program into the memory by receiving the first input signal and activating the shell program by receiving the second input signal. Here, if the second input signal is inputted, the driving means determines whether the shell program is loaded into the memory and then, if the shell program is loaded into the memory, activates the shell program.

In the preferred embodiment, when an operating program is started, the shell program is loaded into the memory. In the preferred embodiment, the first input signal is supplied from a wheel button of a wheel mouse and a predetermined hotkey. In the preferred embodiment, the second input signal is supplied from the wheel button of the wheel mouse. In the preferred embodiment, the driving means possesses a dynamic link library (DLL) suppressing collision of the hotkey.

According to another feature of the present invention, a method for shell program interface of a computer system with a processor, a memory, an input device, and a shell program for selecting and executing a plurality of application programs, comprises the steps of receiving a first input signal from the input device to load the shell program into the memory and receiving a second input signal from the input device to activate the shell program loaded into the memory.

In the preferred embodiment, the method further comprises a step of selecting and executing one of a plurality of the application programs through the activated shell program.

According to the present invention, a shell program is activated through a wheel button of a wheel mouse and a defined hotkey and a wheel is moved back and forth to select and execute one among a plurality of application programs registered in the shell program. At this time, input of the hotkey and the wheel button is determined by using a dynamic link library.

To achieve these and other objects in accordance with the principles of the present invention, as embodied and broadly described, the present invention provides an apparatus, comprising: a computer unit having a processor processing data, a plurality of application programs including data-handling instructions, and a shell program selecting and executing one of said application programs; a memory being coupled to said computer unit and storing the data; an input unit inputting one signal selected from among a first input signal and a second input signal; and a driving unit loading said shell program into said memory by receiving said first input signal, activating said shell program by receiving said second input signal; when said second input signal is inputted, said driving unit determining whether said shell program is loaded into said memory; when said driving unit determines that said shell program is loaded into said memory, said driving unit activating said shell program.

To achieve these and other objects in accordance with the principles of the present invention, as embodied and broadly described, the present invention provides an apparatus, comprising: a computer unit having a processor processing data, a plurality of application programs including data-handling instructions, and a shell program selecting and executing one of said application programs; a memory being coupled to said computer unit and storing the data; an input unit inputting one signal selected from among a first input signal and a second input signal; and a driving unit loading said shell program into said memory in response to said first input signal, activating said shell program in response to said second input signal.

To achieve these and other objects in accordance with the principles of the present invention, as embodied and broadly described, the present invention provides a method, comprising: loading a shell program into a memory in response to receiving a first input signal from an input unit, said memory being coupled to a computer unit having a processor processing data and having a plurality of application programs including data-handling instructions and having said shell program selecting and executing one of said application programs; and executing said shell program loaded into said memory in response to receiving a second input signal from said input unit.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

A program is group of instructions executed by a computer. A program is also known as software. There are two main types of programs: system programs and application programs. The Windows 95 operating system is an example of a system program. The Microsoft Word word processing program, Microsoft Excel spreadsheet program, and Corel Wordperfect word processing program are examples of application programs.

An application program is a complete, self-contained program that performs a specific function directly for the user. This is in contrast to system software such as the operating system which exists to support application programs. Editors for various types of documents and spreadsheets are common examples of application programs.

An operating system is the low-level software which handles the interface to peripheral hardware, schedules tasks, allocates storage, and presents a default interface to the user when no application program is running. Examples of operating systems include Macintosh Operating System, MS-DOS, Unix, Windows 95, Windows 98, and Windows NT. Examples of peripheral hardware include a mouse and a keyboard.

In order to facilitate execution of frequently used application programs, modifications can be made to the personal computer such that a control panel, having a plurality of buttons called "Easy Button" or "Q button," are provided in the front panel of the computer main body. Such buttons may be incorporated into a remote control device of the computer. Each button of the control panel is designated by a particular function of the computer or common application program. By pressing a button, starting or ending of an application program is possible.

However, although the above-noted control panel provides the user with easy and quick access to the computer, the inherent problem is that it has limitation in the number of the buttons. Further, since designation of the functional button has been determined by the computer manufacturer, the computer user could not change the button designation at will. If it is possible to provide more buttons with the front control panel, then too many buttons will cause inconvenience to a user as like many icons registered in the Windows Desktop. Furthermore, the above-noted control panel lacks the ability to choose a main menu or control menu of the selected application program through the button operation.

A system operating method in which a user executes an application program or directs a command to be performed in a general computer system varies in accordance with an installed operating system program and a user interface mode supported by an application program. Recently, an operating system program installed in a computer system generally adopts a graphic user interface (GUI) mode.

For example, an operating system program of the Microsoft Windows 95 uses a keyboard device or a pointing device so as to execute an application program. That is, an icon displayed on a screen is selected by means of the keyboard or a mouse or a file manager is used to execute the application program. The file manager can correspond to Windows Explorer. An operating system program using the graphic user interface basically displays a plurality of icons corresponding to each of application programs on the screen, so that a user can easily execute the application programs.

As the number of application programs installed in a computer system increases, the number of icons displayed on the screen increases. Therefore, the user may feel uncomfortable and may be inconvenienced. The computer system can be set to show an application program on a screen. This makes a beginner search for application programs and execute necessary application programs one by one.

In order to solve this problem, a computer system can possess function buttons which can easily execute a specific program. If a user only selects the function button placed on the outside of a computer body, a corresponding program is executed. In a computer system capable of performing remote control, a remote control device may possess the function button. Since function buttons correspond to specific programs, a specific program can be simply executed or finished by using each of the function buttons.

In spite of the convenience, the number of the function buttons is exceedingly limited. Limited by a manufacturing company, the number of the buttons cannot be varied according to the corresponding application programs. Although a computer system possesses as many buttons as possible, so many buttons actually bring forth inconvenience and inefficiency.

Figure 1:
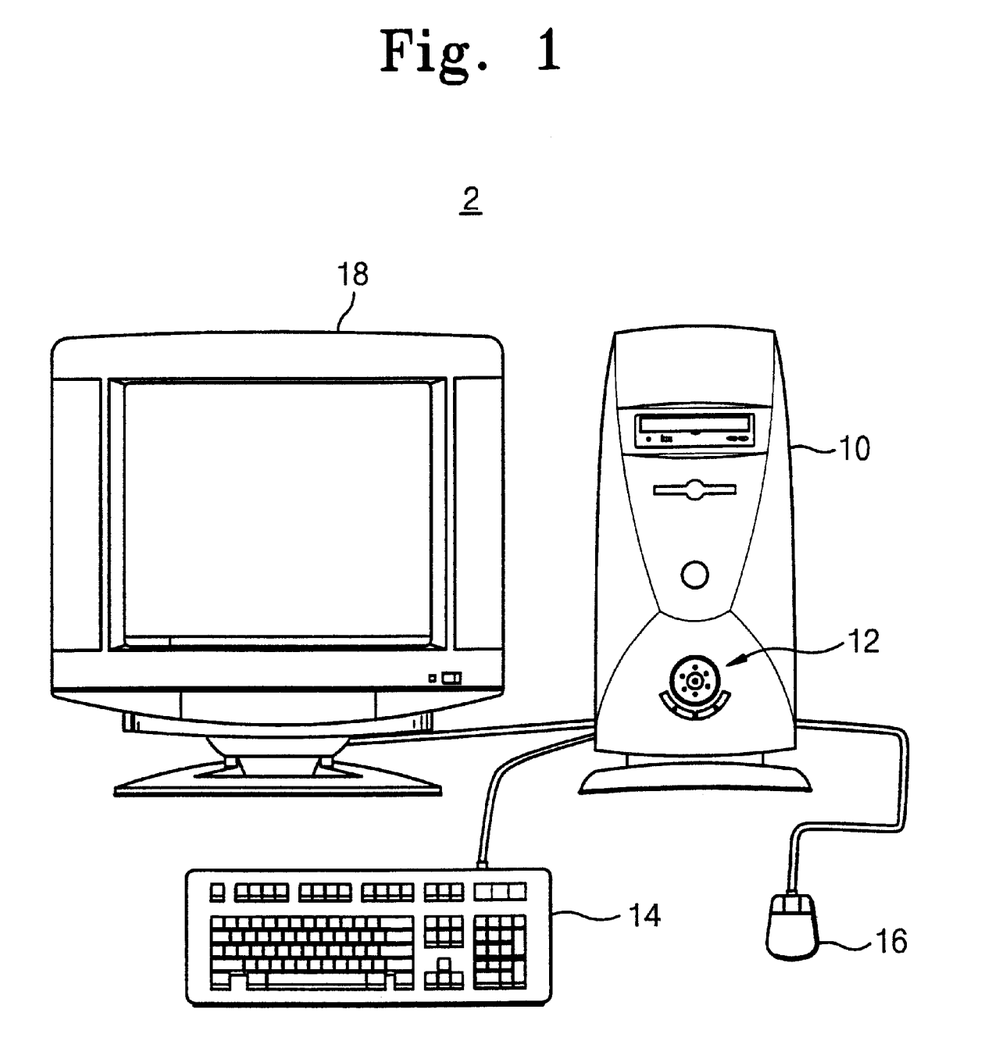
FIG. 1 is a perspective view showing a computer system with a jog dial.
Figure 2:
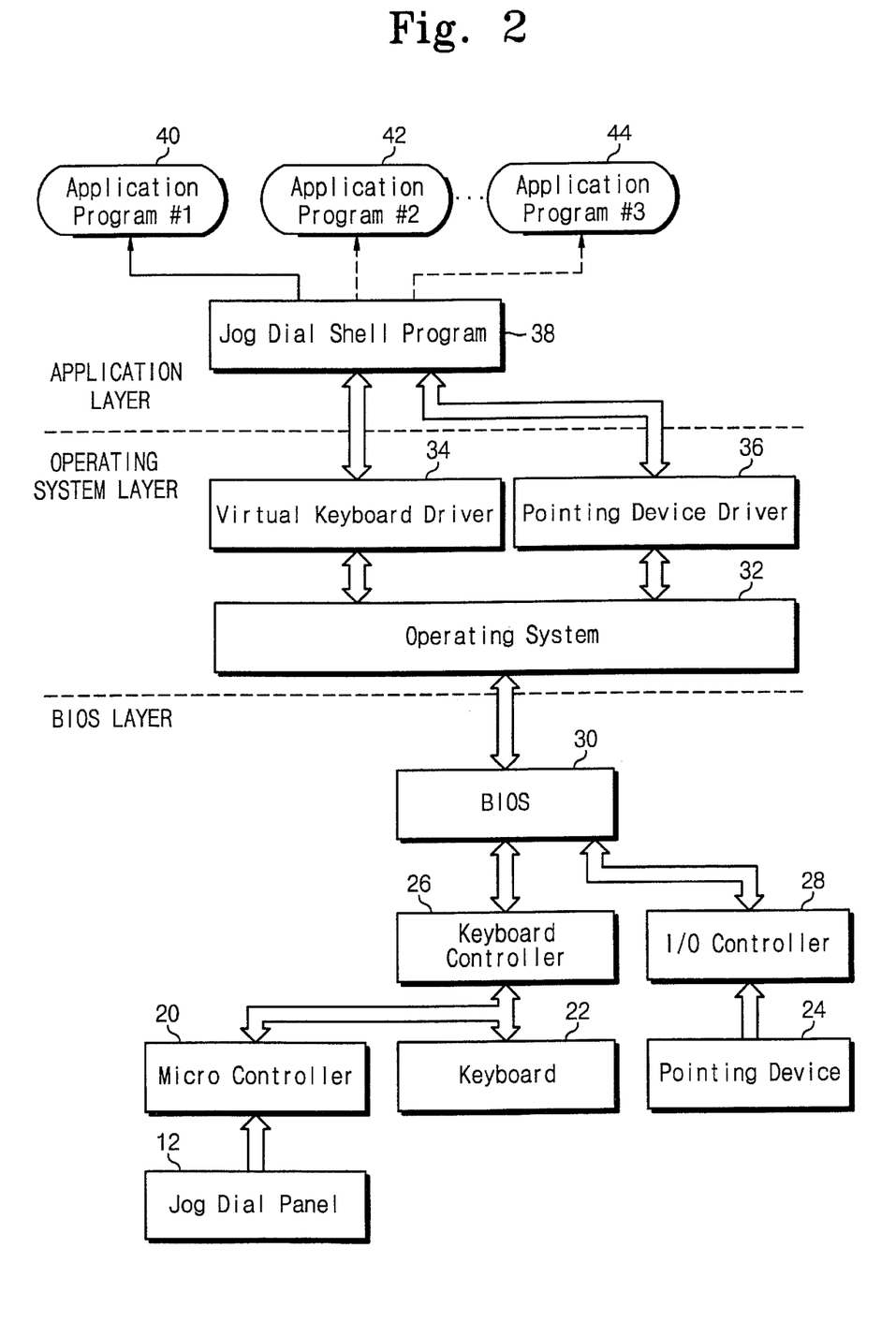
FIG. 2 shows hierarchy structure for describing jog dial shell program interface of a computer system shown in FIG. 1.
Figure 3:
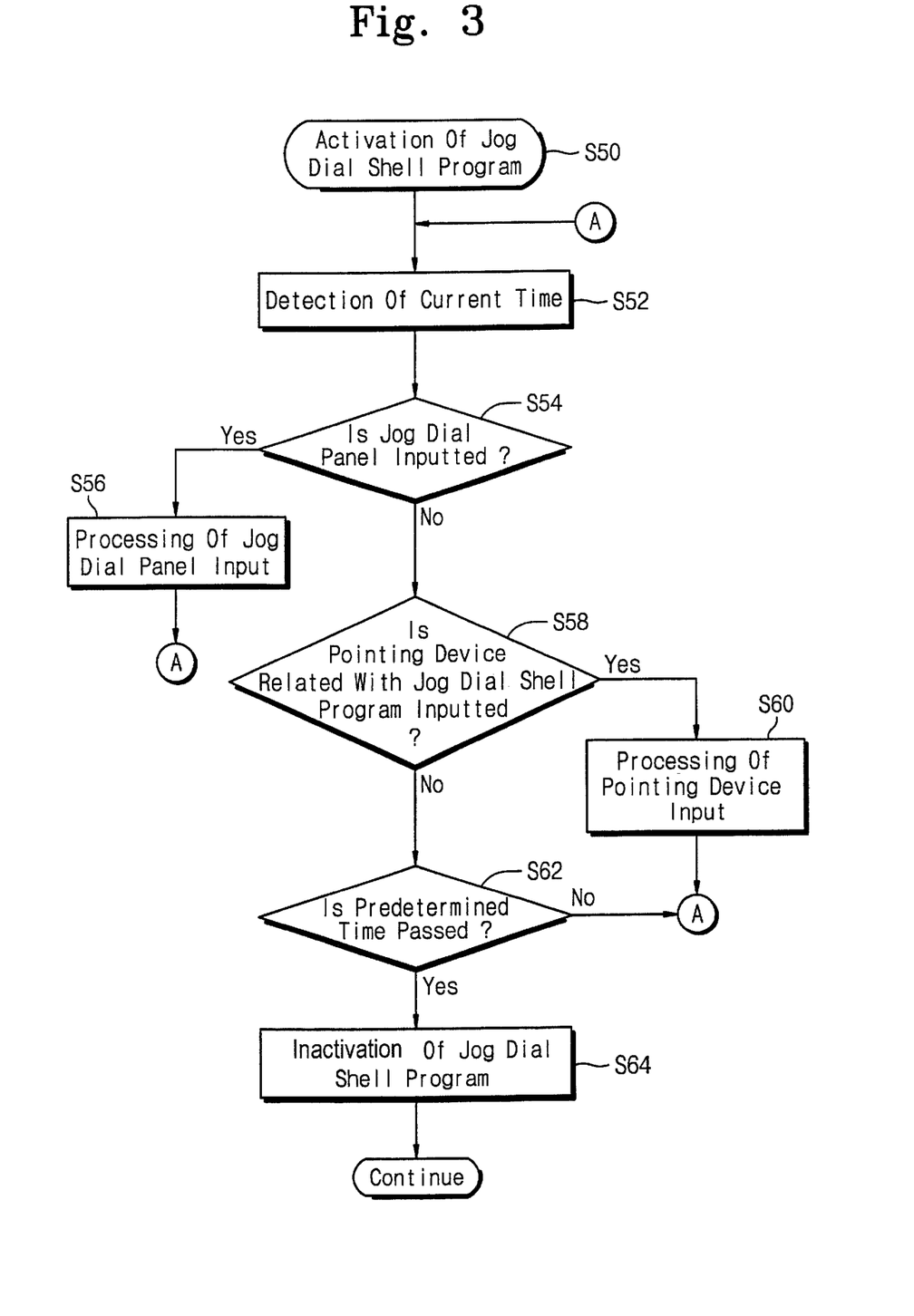
FIG. 3 is a flow chart showing the steps of jog dial shell program interface of a computer system shown in FIG. 1.

A computer system addressing or solving the foregoing problem is shown in FIGS. 1–3. Referring to FIG. 1, a computer system 2 which has a shell program interface function by means of a jog dial possesses a jog dial panel 12 on a front bezel of a computer body 10. A display device 18, a keyboard device 14, and a pointing device 16 are connected to the computer body 10. The pointing device 16 can be a mouse. The display device 18 can be a cathode ray tube, a liquid crystal display, a gas-plasma display, a light emitting diode display, an electro-luminescent display, a field emission display, or other type of device conveying varying visual images to a user.

The jog dial panel 12 comprises a jog dial and a plurality of input buttons. Thus, it is possible to execute one selected from a group consisting of application programs registered in a jog dial shell program in response to right/left circulation of the jog dial panel 12 and operation of an input button.

Referring to FIG. 2, the computer system is roughly divided into a BIOS (basic input/output system) layer, an operating system program layer, and an application program layer. In the BIOS layer, an input signal according to operation of a jog dial or an input button is inputted from a jog dial panel 12 to a microcontroller 20. The microcontroller converts the input signal into a predetermined key scan code, and then supplies the signal to a keyboard controller. A BIOS 30 supplies the key scan code data to an operating system program 32.

A virtual keyboard driver 34 of the operating system program layer determines whether the inputted key scan code is defined by a jog dial function. If there is a corresponding code, the code is supplied to a jog dial shell program 38. Accordingly, the jog dial shell program 38 is activated. The jog dial shell program 38 determines a code supplied from a jog dial panel 12 and then performs selection, execution, and finish of corresponding application programs 40, 42, and 44.

In FIG. 2, a keyboard controller 26 interfaces with a keyboard 22 and the BIOS 30. There is an input/output controller (I/O controller) 28 which interfaces with a pointing device 24 and the BIOS 30. A pointing device driver 36 interfaces with the operating system 32 and the jog dial shell program 38.

FIG. 3 illustrates operating steps of a jog dial shell program. At step S50, the jog dial shell program 38 is executed by, for example, a start program of the operating system program 32 or is started from an inactivated state to a reactivated state through a jog dial. At step S52, the activated jog dial shell program 38 detects the time when the jog dial shell program 38 is activated. At this step S52, information concerning the current time is detected from a BIOS 30.

In FIG. 3, at step S54, the present invention determines whether there is an input from a jog dial panel 12. If the input is detected, the step S56 is performed. If no input is detected, the step S58 is performed. At step S56, a processing corresponding to the input of a jog dial panel 12 is performed.

That is, an application program 40 or 42 or 44 is selected or executed from the jog dial shell program 38 activated by using a jog dial and an input button.

In FIG. 3, at step S58, the present invention determines whether there is an input of a pointing device 24 concerning the jog dial shell program 38. If the input is detected, the step S60 is performed. If no input is detected, the step S62 is performed. At step S60, a processing routine corresponding to the input of the pointing device 24 is performed. For example, it is possible to perform register a new application program in program selection menu of the jog dial shell program 38 by using a right or left button of a mouse 24.

At step S62, if there is no input from the jog dial panel 12 and the pointing device 24, the present invention determines whether the predetermined time has passed by setting a standard for the time detected in step S52. If the time has passed, the step S62 proceeds to a step S64 and the jog dial shell program 38 is iconized. In other words, at step S64, the jog dial shell program 38 is inactivated.

As mentioned above, a user can easily select, execute, and finish a plurality of application programs 40, 42, and 44 registered in the jog dial shell program 38 by using a jog dial panel 12. However, the jog dial panel 12 should be capable of acting as a jog dial shell program interface.

With an application program having many types of key input determination by means of a hotkey, key determining information of a virtual keyboard driver 34 may be overlapped according to hotkey input. Accordingly, the virtual keyboard driver 34 should be modified in response to various application programs. Moreover, operation of a jog dial pad may be inconvenient in accordance with the position where a computer body is set because the jog dial pad is placed on the computer body. For example, the operation of a jog dial pad located on a computer body might be inconvenient if the computer body is located under a table or desk.

Figure 4:
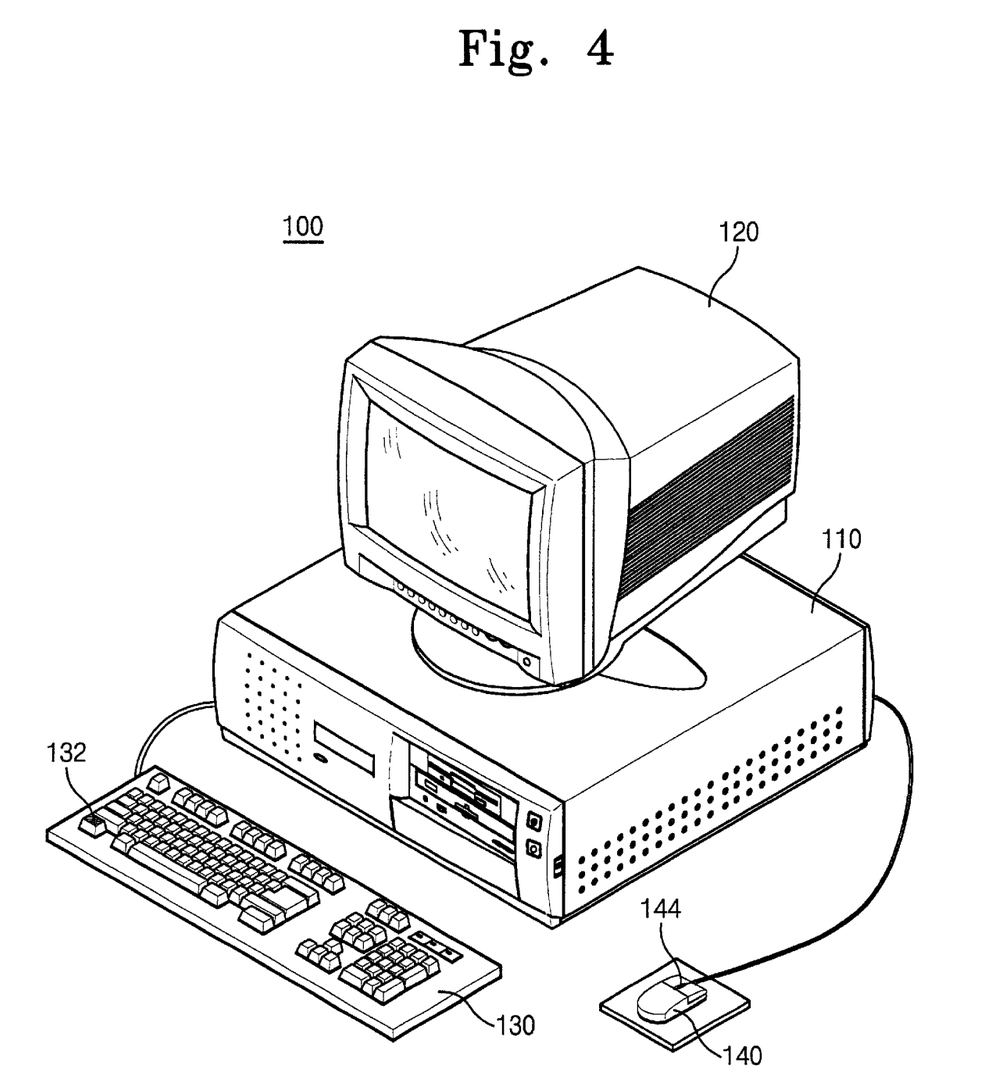
FIG. 4 is a perspective view showing a computer system, in accordance with the principles of the present invention.
Figure 5:
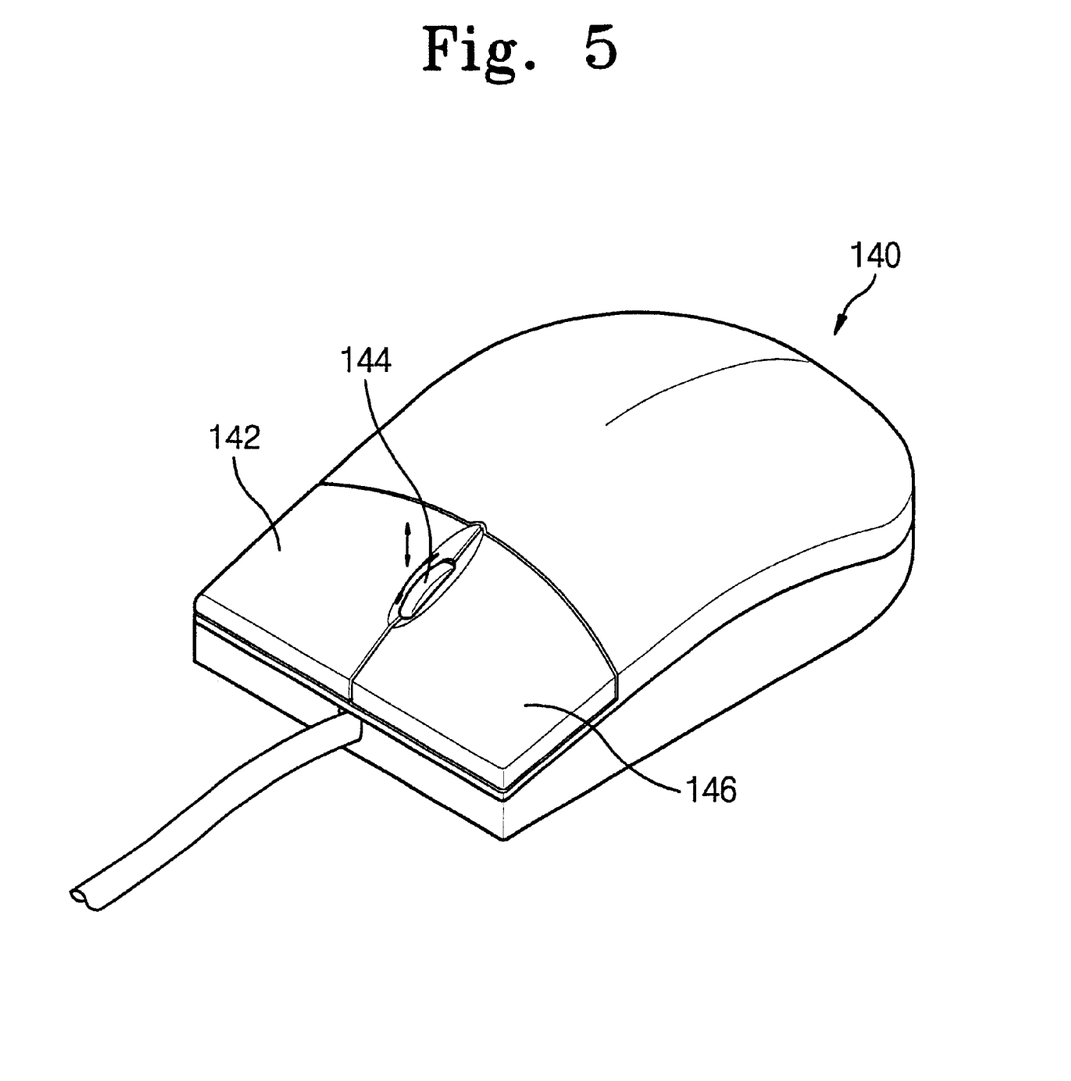
FIG. 5 is an enlarged perspective view showing a wheel mouse shown in FIG. 4, in accordance with the principles of the present invention.

FIG. 4 illustrates a computer system in accordance with the present invention. The computer system possesses a wheel mouse 140 as a pointing input device. Referring to FIG. 4, a computer system 100 possesses a computer body 110, a display device 120, and a keyboard device 130. The keyboard device 130 and the wheel mouse 140 possess a hotkey 132 and a wheel button 144 activating a shell program in accordance with the present invention, respectively. As shown in FIG. 5, a wheel mouse 140 includes a left input button 146, a wheel button 144, and a right input button 142.

The shell program is equal to, for example, a jog dial shell program in function. The shell program is loaded into a memory 160 shown in FIG. 6 or activated by using the hotkey 132 and the wheel button 144 or the wheel button 144.

A computer system may possess a jog dial panel in accordance with another embodiment of the present invention. A jog dial function is disabled and a shell program is activated by using the hotkey 132 and the wheel button 144.

Figure 6:
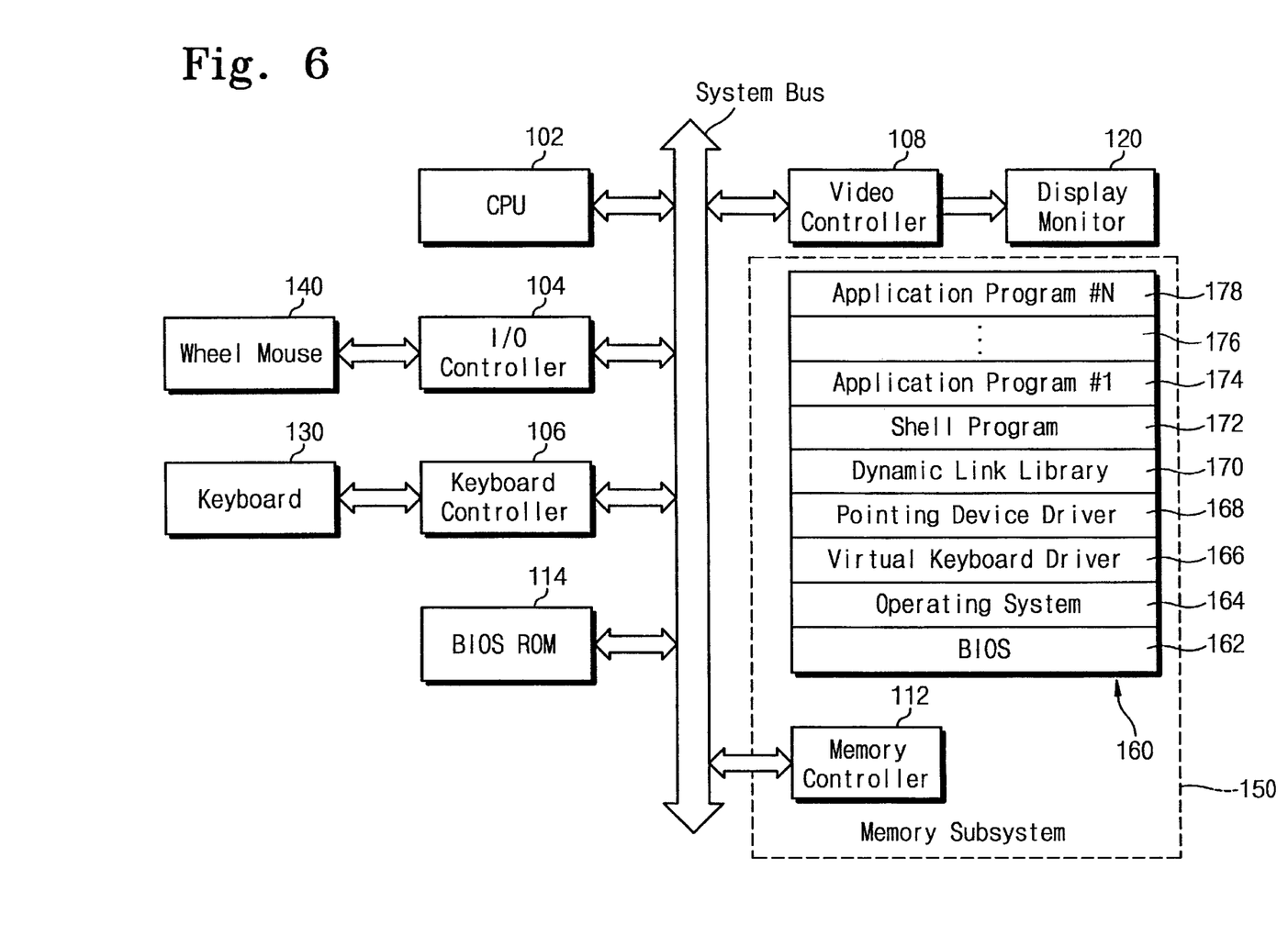
FIG. 6 is a block diagram showing configuration for shell program interface of a computer system shown in FIG. 4, in accordance with the principles of the present invention.

Referring to FIG. 6, a computer system 100 possesses a subsystem 150 including a memory 160 in which a shell program is stored. The computer system 100 includes a central processing unit (CPU) 102, a basic input/output system read only memory (BIOS ROM) 114, an input/output (I/O) controller 104, and a keyboard controller 106. A keyboard 130 is connected to the keyboard controller 106, and a wheel mouse 140 is connected to the input/output controller 104. Further, the computer system 100 includes a video controller 108 and a display device 120.

The computer system 100 includes a plurality of application programs 174, 176, 178 and a shell program 172 driving the application programs 174, 176,178. The shell program 172 registers the application programs 174, 176, 178, thereby displaying a window having a function to select or execute a required application program.

The memory subsystem 150 includes a memory controller 112 for controlling access of a memory 160 and the memory 160 fitted for operation of a system. A basic input/output system (BIOS) 162, an operating system program 164, a virtual keyboard driver 166, a pointing device driver 168, a shell program 172, a plurality of application programs 174, 176, and 178 are loaded into the memory 160. Further, a dynamic link library (DLL) 170 according to the present invention is loaded into the memory 160. In FIG. 6, a system bus couples the central processing unit 102 to subsystem 150, video controller 108, input/output controller 104, keyboard controller 106, and basic input/output system read only memory 114.

The operating system program 164 supports graphical user interface (GUI). Each of the programs installed in the memory 160 is executed by the central processing unit 102. Images corresponding to the programs are displayed in a display device 120 through the video controller 108. In particular, if the shell program 172 is loaded into the memory 160, a tray icon corresponding to the shell program 172 is displayed. If the shell program 172 is executed, a window of the shell program 172 is activated in the display device 120.

Figure 7:
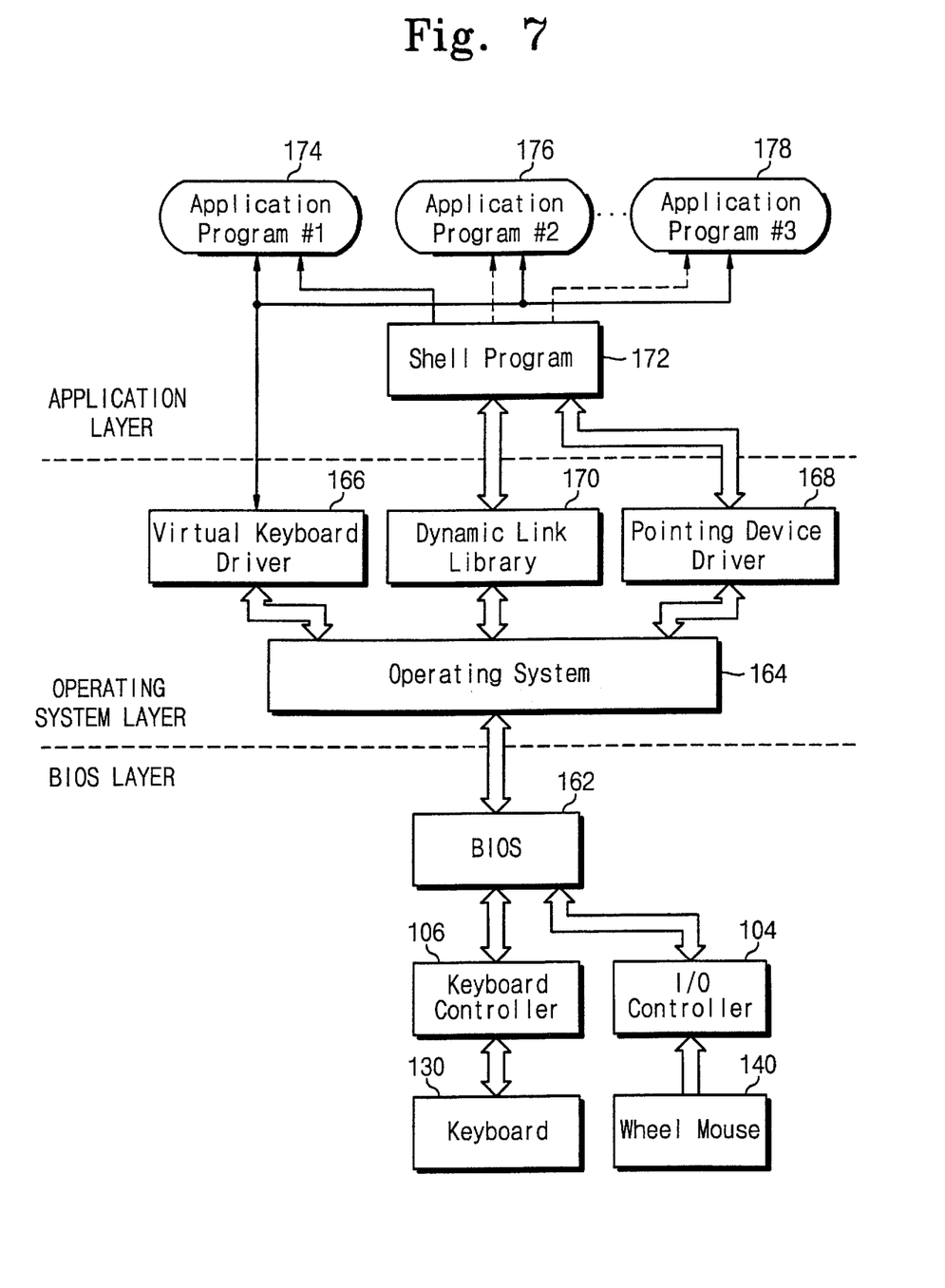
FIG. 7 shows hierarchy structure for describing jog dial shell program interface of a computer system shown in FIG. 4, in accordance with the principles of the present invention.

FIG. 7 illustrates hierarchy structure for describing shell program interface of a computer system shown in FIG. 4. Referring to FIG. 7, the computer system 100 is divided into a basic input/output system (BIOS) layer, an operating system layer, and an application program layer. The basic input/output system layer supplies an input signal for loading the shell program 172 from a keyboard device 130 possessing a hotkey 132 according to the present invention and a wheel button 144 into a memory 160 to a keyboard controller 106 and an input/output controller 104. The basic input/output system 162 is supplied to an operating system 164 in response to the input signal.

The operating system layer includes a virtual keyboard driver (VKD) 166, a pointing device driver 168, and a dynamic link library (DLL) 170. The dynamic link library 170 determines an input of the hotkey 132 and the wheel button 144, and loads the shell program 172 into the memory 160. If the wheel button 144 of the wheel mouse 140 is inputted, the dynamic link library 170 hooks information corresponding to the input and then transfers the information to the shell program 172. Accordingly, if the wheel button 144 is inputted, a window of the shell program 172 is activated through the input. If any processing routine is called, a corresponding routine is called with reference to an index or an address instead of direct calling thereof. This is named "hooking". The hooking supplies high flexibility to the dynamic link library 170 in designing and processing a program. The term "hook" is a term used by programmers. A hook is a software or hardware feature included in order to simplify later additions or changes by a user.

The virtual keyboard driver 166 drives application programs so that each defined hotkey of a plurality of application programs 174, 176, and 178 may be determined and corresponding commands may be performed independent of the hotkey 132 loading the shell program 172 into the memory 160.

Because of the use of the dynamic link library 170 for determining hotkeys defined between application programs 174, 176, and 178 and a shell program 172, it is possible for a computer system to suppress collision of the hotkeys. Further, it is possible to define a hotkey loading the shell program 172 into the memory 160 or activating the shell program 172. Moreover, it is possible to define and use hotkeys required in a program. The DLL170 can help to prevent conflicts from arising when different application programs have incompatible functions assigned to the same predetermined key on a keyboard.

Figure 8:
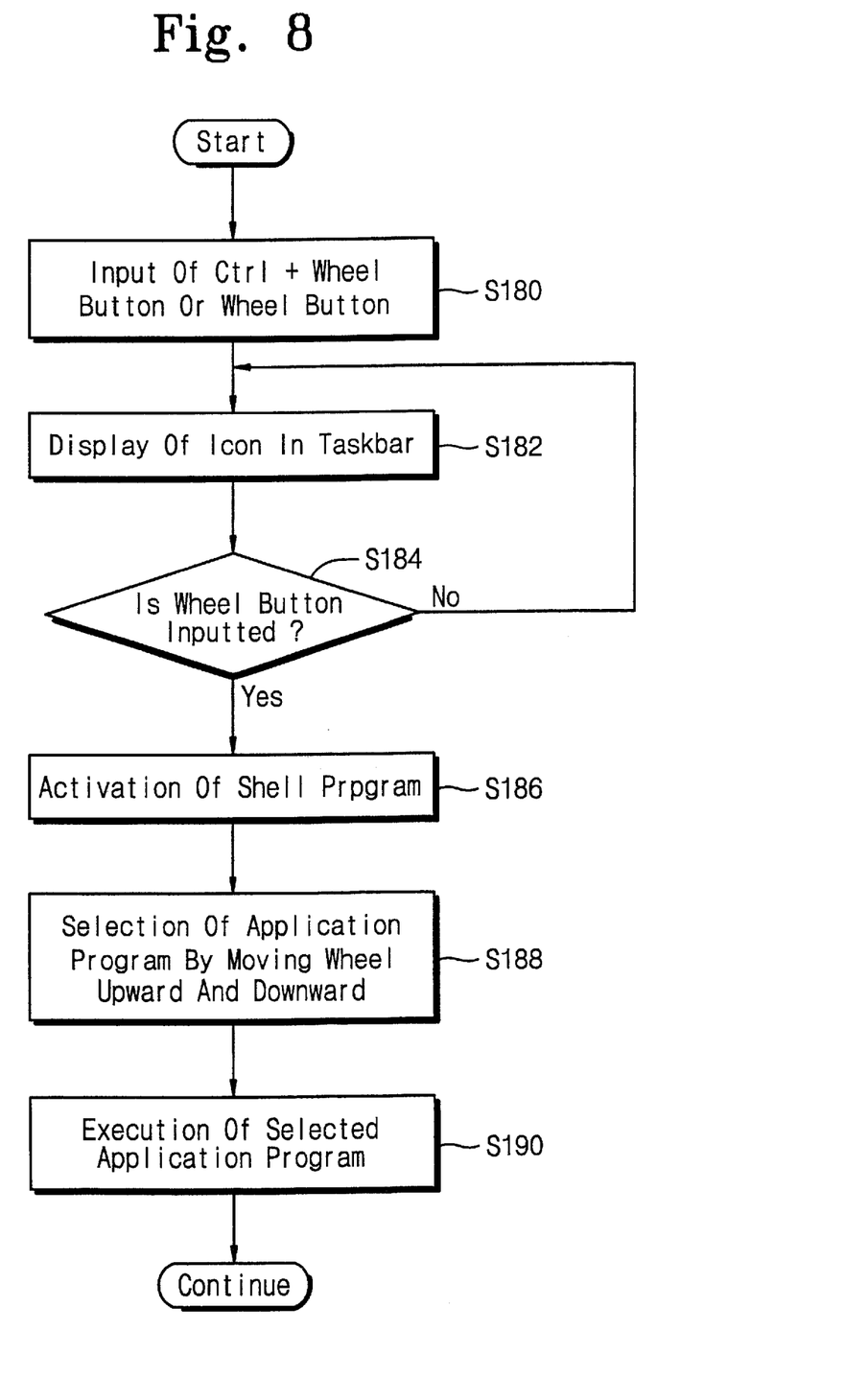
FIG. 8 is a flow chart showing the steps of shell program interface by using a wheel mouse in accordance with a preferred embodiment of the present invention.
Figure 9:
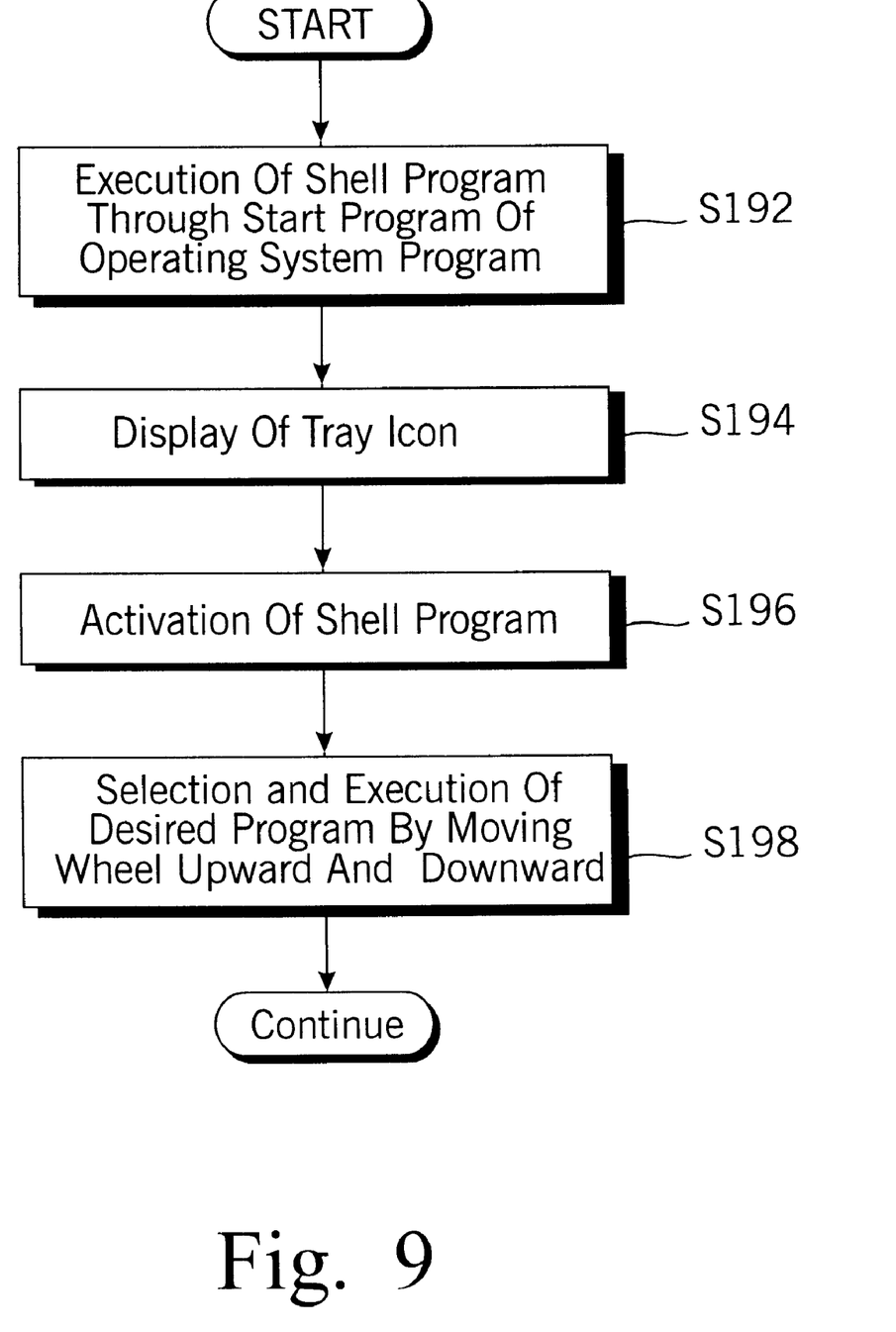
FIG. 9 is a flow chart showing the steps of shell program interface in accordance with another preferred embodiment of the present invention.

FIGS. 8 and 9 illustrate the steps of shell program interface in accordance with the present invention. FIG. 8 illustrates the steps of loading a shell program by using defined hotkeys and a wheel button or only the wheel button and the steps of activating the shell program by using the wheel button. FIG. 9 illustrates the steps of loading the shell program into a memory by using a start program of an operating system program.

Referring to FIG. 8, at step S180, if a hotkey 132 and a wheel button 144 for defining a shell program 172 are inputted, then the input is loaded into a memory. Or, at step S180, if the wheel button 144 is inputted, then the shell program 172 is activated by using only the wheel button 144. The hotkey 132 can correspond to the Ctrl key, for example. Thus, at step S180, a determination is made as to whether an input signal activating the shell program 172 is receiving input of the hotkey 132 and the wheel button 144, as defined by the dynamic link library 170.

At step S182, the shell program 172 is displayed as a tray icon which is a waiting state. At step S184, if the wheel button 144 is inputted, the dynamic link library 170 determines this input and then step S186 is performed. At step S184, if the wheel button 144 is not inputted, then step S182 is performed.

At step S186, a window of the shell program 172 is activated. At step S188, the wheel button 144 is rotated in a forward circular motion and a backward circular motion, so that a required application program can be selected by moving the wheel button 144 between a plurality of application programs registered in a shell program window. At step S190, the selected application program is executed.

Referring to FIG. 9, at step S192, if an operating system program is booted, then a computer system of this preferred embodiment executes a shell program 172 registered in a start program. That is, the shell program 172 is loaded into a memory 160. At step S194, the shell program 172 loaded in step S192 is displayed as a tray icon in a taskbar of an operating system program 164. At step S196, if a tray icon is executed by using a wheel button 144, a window of the shell program 172 is activated. At step S198, the wheel button 144 is rotated forward and backward, thereby selecting and executing a particular application program that a user requires.

In the steps of FIGS. 8–9, if the wheel button 144 is used, any key (e.g., direction key and enter key) of a keyboard is used to activate a shell program or select and execute application programs.

According to the present invention, a shell program of a computer system with a plurality of application programs is activated by using a wheel mouse and a keyboard input device, thereby applying the shell program to a general computer having no jog dial pad.

Further, a wheel mouse and a hot key are utilized to easily use a shell program activated in a region where a user can easily operate. Moreover, a dynamic link library (DLL) for determining a hotkey is applied to simply implement a virtual keyboard driver and suppress collision of a plurality of hotkeys which application programs have.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a computer unit having a processor processing data, a plurality of application programs including data-handling instructions, and a shell program selecting and executing one of said application programs;
   a memory being coupled to said computer unit and storing the data;
   an input unit inputting one signal selected from among a first input signal and a second input signal; and
   a driving unit loading said shell program into said memory in response to receiving said first input signal;
   when said second input signal is inputted, said driving unit determining whether said shell program is loaded into said memory;
   when said driving unit determines that said shell program is loaded into said memory, said driving unit activating said shell program in response to receiving said second input signal.

2. The apparatus of claim 1, further comprising said computer unit having an operating system program including instructions for operating said computer unit.

3. The apparatus of claim 2, further comprising said shell program being loaded into said memory when said operating system program is started.

4. The apparatus of claim 3, said input unit further comprising:
   a first input device including a button; and
   a second input device including a switch;
   said first input signal being inputted when both said button and said switch are manipulated by a user.

5. The apparatus of claim 4, said first input device corresponding to an electronic mouse device, said button corresponding to a wheel button being rotatable, said second input device corresponding to a keyboard, said switch corresponding to a predetermined key of said keyboard.

6. The apparatus of claim 1, said input unit further comprising:
   a first input device being coupled to said computer unit, said first input device including a button; and
   a second input device being coupled to said computer unit, said second input device including a switch;
   said first input signal being inputted when both said button and said switch are manipulated by a user.

7. The apparatus of claim 6, said first input device corresponding to an electronic mouse device, said button corresponding to a wheel button being rotatable, said second input device corresponding to a keyboard, said switch corresponding to a predetermined key of said keyboard.

8. The apparatus of claim 1, said first input signal being inputted from a wheel button of a wheel mouse and a predetermined hotkey, said wheel button of said wheel mouse and said predetermined hotkey corresponding to said input unit.

9. The apparatus of claim 1, said input unit further comprising a first input device including a button, said second input signal being inputted when said button is manipulated by a user.

10. The apparatus of claim 9, said first input device corresponding to an electronic mouse device, said button corresponding to a wheel button being rotatable.

11. The apparatus of claim 1, said input unit further comprising a first input device being coupled to said computer unit, said first input device including a button, said second input signal being supplied from said button.

12. An apparatus, comprising:
   a computer unit having a processor processing data, a plurality of application programs including data-handling instructions, and a shell program selecting and executing one of said application programs;
   a memory being coupled to said computer unit and storing the data;
   an input unit inputting one signal selected from among a first input signal and a second input signal; and
   a driving unit loading said shell program into said memory in response to said first input signal, activating said shell program in response to said second input signal.

13. The apparatus of claim 12, further comprising:
   said input unit including a first input device being coupled to said computer unit;
   said first input device including a button, said second input signal being supplied from said button, said first input device corresponding to an electronic mouse device, said button corresponding to a wheel button being rotatable; and
   said driving unit including a dynamic link library resolving conflict among said plurality of application programs.

14. The apparatus of claim 13, further comprising:
   when said second input signal is inputted, said driving unit determining whether said shell program is loaded into said memory; and
   when said driving unit determines that said shell program is loaded into said memory, said driving unit activating said shell program.

15. A method, comprising:
   loading a shell program into a memory in response to receiving a first input signal from an input unit, said memory being coupled to a computer unit having a processor processing data and having a plurality of application programs including data-handling instructions and having said shell program selecting and executing one of said application programs; and
   executing said shell program loaded into said memory in response to receiving a second input signal from said input unit.

16. The method of claim 15, further comprising selecting and executing one of said application programs through said activated shell program.

17. The method of claim 16, further comprising loading said shell program into said memory when an operating system program is started, said computer unit having said operating system program including instructions for operating said computer unit.

18. The method of claim 16, further comprising:
   manipulating a button mounted on said first input unit; and
   manipulating a switch mounted on said first input unit, said first input signal being inputted when both said button and said switch are manipulated by a user.

19. The method of claim 18, said first input unit corresponding to a first device having said button and a second device having said switch, said first and second devices being in communication with said computer unit, said first and second devices being separately located.

20. The method of claim 19, said first device corresponding to an electronic mouse device, said button corresponding to a wheel button being rotatable, said second device corresponding to a keyboard, said switch corresponding to a predetermined key of said keyboard.

* * * * *